US011151690B2

(12) United States Patent
Jia

(10) Patent No.: US 11,151,690 B2
(45) Date of Patent: Oct. 19, 2021

(54) IMAGE SUPER-RESOLUTION RECONSTRUCTION METHOD, MOBILE TERMINAL, AND COMPUTER-READABLE STORAGE MEDIUM

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/944,962

(22) Filed: Jul. 31, 2020

(65) Prior Publication Data
US 2021/0133926 A1 May 6, 2021

(30) Foreign Application Priority Data

Nov. 4, 2019 (CN) .......................... 201911066747.6

(51) Int. Cl.
*G06T 3/40* (2006.01)
*G06T 7/33* (2017.01)
*G06T 7/90* (2017.01)

(52) U.S. Cl.
CPC .......... *G06T 3/4053* (2013.01); *G06T 3/4046* (2013.01); *G06T 7/33* (2017.01);
(Continued)

(58) Field of Classification Search
CPC . G06T 3/4053–4076; G06T 7/33; G06T 7/90; G06T 3/4046; G06T 2207/10016; G06T 2207/20221; G06T 2207/10024
See application file for complete search history.

(56) References Cited

U.S. PATENT DOCUMENTS 8,995,793 B1\* 3/2015 Laflen ................... G06T 3/4053
382/299
2003/0189983 A1\* 10/2003 Hong ................... H04N 19/523
375/240.27
(Continued)

FOREIGN PATENT DOCUMENTS

CN 101980289 A 2/2011
CN 106204440 A 12/2016
(Continued)

OTHER PUBLICATIONS

Nasrollahi et al., Finding and Improving the Key-frames of Long Video Sequences for Face Recognition. (6 pages).
(Continued)

*Primary Examiner* — Sean T Motsinger
(74) *Attorney, Agent, or Firm* — Young Basile Hanlon & MacFarlane, P.C.

(57) ABSTRACT

The disclosure provides an image super-resolution reconstruction method, a mobile terminal, and a computer-readable storage medium. The method includes: obtaining continuous N first YUV images; extracting N luma images and N chroma images from the N first YUV images; performing sequentially sharpness estimation, image registration, and image reconstruction based on a neural network on the N luma images; performing image reconstruction on the N chroma images; and fusing the chroma image obtained after reconstruction and the luma image obtained after reconstructions to obtain the target YUV image that has a higher resolution than the N first YUV images.

20 Claims, 3 Drawing Sheets

(52) U.S. Cl.
CPC ...... *G06T 7/90* (2017.01); *G06T 2207/10016* (2013.01); *G06T 2207/10024* (2013.01)

(56) References Cited

U.S. PATENT DOCUMENTS

| | | | |
|---|---|---|---|
| 2007/0041664 A1* | 2/2007 | Yamada | G06T 3/4053 382/299 |
| 2009/0185760 A1* | 7/2009 | Okada | G06T 3/4069 382/299 |
| 2012/0051667 A1 | 3/2012 | Kang et al. | |
| 2014/0307971 A1* | 10/2014 | Hanzawa | G06T 3/4053 382/195 |
| 2014/0375836 A1* | 12/2014 | Amitay | G06T 3/403 348/222.1 |
| 2018/0005361 A1* | 1/2018 | Bulyshev | G06T 3/4053 |
| 2018/0336662 A1* | 11/2018 | Kimura | G06T 3/4053 |
| 2019/0045168 A1* | 2/2019 | Chaudhuri | G06T 1/20 |
| 2019/0139205 A1* | 5/2019 | El-Khamy | G06K 9/6256 |
| 2019/0259136 A1* | 8/2019 | Shpalensky | G06K 9/00369 |
| 2020/0250794 A1* | 8/2020 | Zimmer | G06T 3/4076 |
| 2020/0342572 A1* | 10/2020 | Chen | G06N 3/08 |
| 2020/0402205 A1* | 12/2020 | Su | G06T 3/4053 |
| 2020/0412945 A1* | 12/2020 | Shao | H04N 5/23254 |
| 2021/0090217 A1* | 3/2021 | Jiang | G06K 9/6288 |
| 2021/0104018 A1* | 4/2021 | Moon | G06T 3/4046 |
| 2021/0133926 A1* | 5/2021 | Jia | G06T 3/4053 |
| 2021/0192801 A1* | 6/2021 | Zeller | G06T 3/4046 |
| 2021/0241470 A1* | 8/2021 | Tang | G06N 3/04 |

FOREIGN PATENT DOCUMENTS

| | | | |
|---|---|---|---|
| CN | 107220934 A | * | 9/2017 |
| CN | 107220934 A | | 9/2017 |
| CN | 108154474 A | | 6/2018 |
| CN | 109961396 A | | 7/2019 |
| CN | 110827200 A | | 2/2020 |
| GN | 108280804 A | | 7/2018 |

OTHER PUBLICATIONS

Rubert et al., Learning Based Super-Resolution Using YUV Model for RemoteSensing Images. (4 pages).

Extended European Search Report for EP Application 20192785.2 dated Feb. 5, 2021. (12 pages).

Petrou et al., Super-resolution in practice: the complete pipeline from image capture to super-resolved subimage creation using a novel frame selection method, Machine Vision and Applications, vol. 23, Mar. 5, 2010. (441-459 pages).

Nasrollahi et al., Super-resolution: a comprehensive survey, Machine Vision and Applications, vol. 25, Jun. 14, 2014. (1423-1468 pages).

Kappeler et al., Video Super-Resolution With Convolutional Neural Networks, IEEE Transactions on Computational Imaging, vol. 2, No. 2, Jun. 2016. (109-122 Pages).

Image Super Resolution Reconstruction Algorithm Based on Sparse Representation and the UV Chroma Processing Cao Qi, Guibin Zhu, Xiaoyong Ji, Lin Zhao; Chongqing Key Laboratory of Emergency Communication, Chongqing Communication Institute Chongqing, China; 6 pages.

Research on Super-resolution Reconstruction of Image Sequences; Xu Zhigang 2012.

ISR for PCT application PCTCN2020110878 dated Oct. 28, 2020.

* cited by examiner

IMAGE SUPER-RESOLUTION RECONSTRUCTION METHOD, MOBILE TERMINAL, AND COMPUTER-READABLE STORAGE MEDIUM

CROSS-REFERENCE TO RELATED APPLICATION(S)

This application claims priority to Chinese Patent Application No. 201911066747.6, filed on Nov. 4, 2019, the entire contents of which are incorporated herein by reference.

TECHNICAL FIELD

The disclosure belongs to a field of image processing technologies, and more particularly, to an image super-resolution reconstruction method, a mobile terminal, and a computer-readable storage medium.

BACKGROUND

Due to a sub-pixel displacement existing during a process of photographing a plurality of images, the plurality of images may include higher resolution information. Based on this, a super-resolution reconstruction method based on the plurality of images has been proposed. Existing super-resolution reconstruction methods generally include two main steps: image registration and fusion reconstruction. The quality of image registration determines whether the higher resolution information included in the plurality of images is utilized accurately in operations of subsequent fusion reconstruction. However, since image registration is often computationally intensive and highly susceptible to motion modes (such as trembling of hands) and image quality, registration errors are inevitable. As registration errors will be converted into reconstruction errors, the quality of the reconstructed image finally obtained is influenced adversely.

SUMMARY

A first aspect of the disclosure provides an image super-resolution reconstruction method. The method includes: obtaining continuous N first YUV images, N being a positive integer greater than 1; extracting a luma image and a chroma image corresponding to each of the N first YUV images to obtain N luma images and N chroma images; selecting, based on sharpness of each of the N luma images, a reference luma image from the N luma images; performing image registration on remaining images in the N luma images except the reference luma image and the reference luma image to obtain an offset of each of the remaining images relative to the reference luma image; fusing, based on the offset of each of the remaining images relative to the reference luma image, the N luma images through a trained neural network to obtain a target luma image, the target luma image having a higher resolution than the first YUV images; performing, based on a reference chroma frame, interpolation processing on the N chroma images to obtain a target chroma image, the reference chroma frame being a chroma image associated with the reference luma image in the N chroma images, and the target chroma image having a higher resolution than the first YUV images; and synthesizing the target luma image and the target chroma image to obtain a target YUV image.

A second aspect of the disclosure provides a mobile terminal. The mobile terminal includes a storage device, and a processor. The storage device is configured to store a computer program. The processor is configured to execute the computer program, to carry out the method as described in the first aspect are implemented.

A third aspect of the disclosure provides a computer-readable storage medium having a computer program stored thereon. When the computer program is executed by a processor, actions of the method as described in the first aspect are implemented.

BRIEF DESCRIPTION OF DRAWINGS

In order to clearly illustrate technical solutions of embodiments of the disclosure, a brief description to drawings used in the description of embodiments or related art is given below. Obviously, the drawings in the following descriptions are only part embodiments of the disclosure, and for those skilled in the art, other drawings can be obtained according to these drawings without creative labor.

DETAILED DESCRIPTION

In the following description, for the purpose of illustration rather than limitation, details such as specific system structures and technologies are proposed for a thorough understanding of embodiments of the disclosure. However, those skilled in the art should understand that the disclosure may also be implemented in other embodiments without the above details. In other cases, detailed descriptions of well-known systems, apparatuses, circuits, and methods are omitted to prevent unnecessary details from hindering the description of the disclosure. The following description will be made with reference to specific embodiments to explain the technical solutions of the disclosure.

Figure 1:
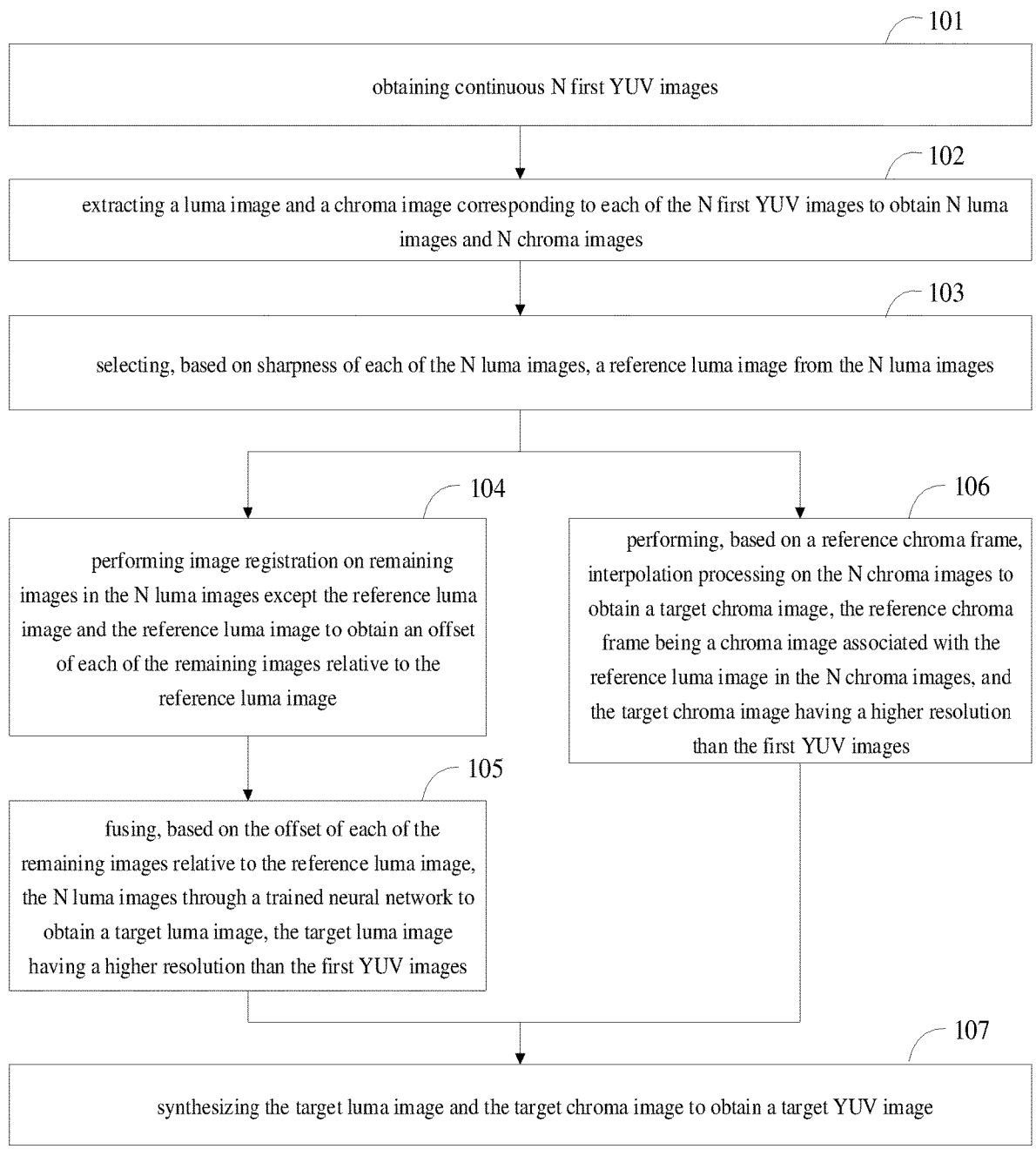
FIG. 1 is a flowchart of an implementation process of an image super-resolution reconstruction method according to an embodiment of the disclosure.

The following describes an image super-resolution reconstruction method according to an embodiment of the disclosure. With reference to FIG. 1, the image super-resolution reconstruction method may include the following.

At block 101, continuous N first YUV (Luma and Chroma) images are obtained. The first YUV images may have a low resolution. N is a positive integer greater than 1.

That is, a plurality of continuous first YUV images is obtained. In detail, the continuous N first YUV images may be collected by a camera applicable to a mobile terminal after a burst shooting (or continuous shooting) instruction input by a user is received. The burst shooting instruction may be a single-click input or a long press input. Or, the continuous N first YUV images may be intercepted by the mobile terminal from a video stream. The disclosure is not limited in this regard.

It should be noted that if the continuous N images that are not in a YUV format are obtained by the mobile terminal, it may convert the continuous N images obtained into the continuous N images in the YUV format. The image format conversion is well-known and will not be repeated herein.

At block 102, a luma image and a chroma image corresponding to each of the N first YUV images are extracted to obtain N luma images and N chroma images.

In the embodiment of the disclosure, since the YUV image includes luma information and chroma information, and human eyes perceive the luma information better than the chroma information, luma information and chroma information of each of the N first YUV images may be extracted to obtain N luma images and N chroma images. In detail, the luma image corresponding to each of the N first YUV images is extracted through a preset Y (represents luma) channel, and the chroma image corresponding to each of the N first YUV images is extracted through a preset UV (represents chroma) channel.

At block 103, a reference luma image is selected, based on sharpness of each of the N luma images, from the N luma images.

In the embodiment of the disclosure, sharpness of the luma image may be evaluated based on local luma features of the luma image to calculate a sharpness value of each of the N luma images. The luma image with the highest sharpness value is determined as the reference luma image in the above N luma images. In detail, actions of calculating the sharpness value of each of the N luma images may include the following.

A1, a luma image to be calculated is segmented into two or more sub-image areas.

According to the embodiment of the disclosure, the same process is used to calculate the sharpness value of each of the N luma images, so any one of the above-mentioned N luma images is selected as the luma image to be calculated, and the calculation of the sharpness value is explained based on the luma image to be calculated. In order to calculate the sharpness value of the luma image to be calculated through local luma features, the luma image to be calculated may be segmented into two or more sub-image areas. In detail, the luma image to be calculated may be segmented into $k_1*k_2$ sub-image areas, and an area of each of the $k_1*k_2$ sub-image areas is equal. In other words, the luma image is segmented into a sub-image area matrix with $k_1$ columns and $k_2$ rows, where $k_1$ and $k_2$ are both positive integers.

A2, a luma value of each pixel in the luma image to be calculated is obtained.

The luma value of each pixel in the luma image may be Y of the corresponding pixel in the YUV image. If the YUV image is obtained, the luma value of each pixel in the luma image may be obtained from the YUV image directly. If the image in the RGB (Red-Green-Blue) format is obtained, the luma value of each pixel in the luma image may be obtained by a formula of Y=0.299*R+0.587*G+0.114*B.

The luma value of each pixel in the luma image to be calculated may be obtained first, and then the luma image to be calculated may be segmented into two or more sub-image areas. Alternatively, the luma image to be calculated may be segmented into two or more sub-image areas first, and then the luma value of each pixel in each sub-image area is obtained. The execution order of the above actions A1 and A2 is not limited here.

A3, a maximum luma value and a minimum luma value in each of the sub-image areas are determined based on the luma value of each pixel.

By traversing the luma value of each pixel in each sub-image area, the maximum luma value and the minimum luma value in each sub-image area may be found. In the above manner, the maximum luma value and the minimum luma value in each sub-image area are finally determined.

A4, sharpness estimation is performed, based on the maximum luma value and the minimum luma value in each of the sub-image areas, on the luma image to be calculated through a preset sharpness reference model to obtain a sharpness value of the luma image to be calculated.

The formula used to perform the sharpness estimation on the luma image to be calculated through the preset sharpness reference model is as follows:

$$\text{Sharpness} = EME(I)$$

$$EME = \frac{2}{k_1 k_2} \sum_{l=1}^{k_1} \sum_{k=1}^{k_2} lg\left(\frac{I_{max,k,l}}{I_{min,k,l}}\right)$$

In the above formula, Sharpness represents the calculated sharpness value of the luma image to be calculated; $k_1$ and $k_2$, as explained in action A1, represent that the luma image to be calculated is segmented into $k_1*k_2$ sub-image areas; EME represents the sharpness reference model; and I represents luma, $I_{max, k, l}$ represents the maximum luma value in k*l sub-image area, and $I_{min, k, l}$ represents the minimum luma value in the k*l sub-image area. Through the above formula, the sharpness value of the luma image to be calculated may be obtained. The sharpness value of each of the N luma images is calculated in the same process, and the luma image with the highest sharpness value is determined as the reference luma image.

At block 104, image registration is performed on remaining images in the N luma images except the reference luma image and the reference luma image to obtain an offset of each of the remaining images relative to the reference luma image.

In embodiments of the disclosure, after the reference luma image is determined, image registration may be performed on remaining images based on the reference luma image to obtain the offset of each of the remaining images relative to the reference luma image. In detail, the above action in block 104 includes the following.

B1, feature point detection is performed on a luma image to be matched and the reference luma image separately.

Since embodiments of the disclosure adopt the same process for the image registration performed on each of the remaining images, any one of the remaining luma images of the above N luma image is selected as the luma image to be matched, and the image registration of the luma image to be matched and the reference luma image is described based on the luma image to be matched. First, the feature point detection is performed on the luma image to be matched and the reference luma image separately based on a preset scale-invariant feature transform (SIFT) algorithm. The essence of the SIFT algorithm is to find feature points on different scale spaces, to calculate, for example, sizes, directions and scale information, of the feature points, and to use the above information to describe the feature points. It should be noted that the feature points found by the SIFT algorithm are less affected by factors such as illumination, affine transformation, or noise, that is, the feature points found by the SIFT algorithm are relatively stable, which may ensure the accuracy of feature point matching. Of course, the feature points may also be detected and described based on other feature point detection algorithms. For example, an algorithm such as a speeded-up robust feature (SURF) detection algorithm or a corner point feature detection algorithm may be used, which is not limited here.

B2, a Euclidean distance between each feature point of the luma image to be matched and a corresponding feature point of the reference luma image is calculated.

After finding the feature points of the luma image to be matched and corresponding feature points in the reference luma image, it is necessary to calculate the Euclidean distance between each feature point of the luma image to be matched and the corresponding feature point of the reference luma image. In detail, for the luma image to be matched, a gradient histogram of each feature point is established based on other pixels included in an area where each feature point is located; and for the reference luma image, a gradient histogram of the corresponding feature point is established based on other pixels included in an area where each feature point is located. And then, a feature vector of each feature point of the luma image to be matched is generated based on the gradient histogram of each feature point, and a feature vector of the corresponding feature point is generated based on the gradient histogram of the corresponding feature point. For example, the feature vector is represented by $$\overset{1}{x} = x(x_1, x_2, \ldots, x_n)$$

for the luma image to be matched. The feature vector is a description of one feature point. Finally, the Euclidean distance between each feature point of the luma image to be matched and the corresponding feature point of the reference luma image is calculated based on the feature vectors of a pair of feature points. In embodiments of the disclosure, assuming that the luma image to be matched is $Y_K$ (which refers to the $K^{th}$ luma image) and the reference luma image is $Y_0$, feature points of $Y_0$ and $Y_K$ are detected respectively, and represented as two sets of feature points $Y_0$: $\vec{x}_{Y_{01}}$, $\vec{x}_{Y_{02}}$, ... $\vec{x}_{Y_{0n}}$ and $Y_K$: $\vec{x}_{Y_{K1}}$, $\vec{x}_{Y_{K2}}$, ... $\vec{x}_{Y_{KN}}$. The calculation formula of the above Euclidean distance may be expressed as $$d_{PQ} = \|\vec{x}_{Y_{0P}} - \vec{x}_{Y_{KQ}}\|_2.$$

B3, a homography matrix of the luma image to be matched to the reference luma image is solved, based on the Euclidean distance between each feature point of the luma image to be matched and the corresponding feature point of the reference luma image, to obtain an offset of the luma image to be matched to the reference luma image.

When four or more pairs of feature points that are closest to each other in $Y_0$ and $Y_k$ are found, the four or more pairs of feature points may be determined as corresponding feature points. Based on this, coefficients of the homography matrix $H_K$ may be solved by a direct linear transformation (DLT) here. In detail, the homography matrix $H_K$ of the luma image $Y_k$ to the reference luma image $Y_0$ is expressed as follows:

$$\begin{bmatrix} x` \\ y` \\ w` \end{bmatrix} = \begin{bmatrix} h_1 & h_2 & h_3 \\ h_4 & h_5 & h_6 \\ h_7 & h_8 & h_9 \end{bmatrix} \begin{bmatrix} x \\ y \\ w \end{bmatrix}$$

where, (x, y) represents coordinates of any point in $Y_K$, the 3×3 matrix represents the homography matrix $H_K$, and the transformed point (x', y') represents coordinates of the above (x, y) after the above (x, y) is registered to the reference luma image $Y_0$, and w'=w=1. Therefore, a displacement [$m_{vxk}$, $m_{vyk}$] of each point in $Y_K$ relative to $Y_0$ may be calculated based on the homography matrix $H_K$ described above, and finally a two-channel offset vector graph of the same size as $Y_0$ and $Y_K$ may be formed. After the above feature point matching operation, it is assumed that $Y_K$ has coordinates of feature points being $(x_1, y_1)$, $(x_2, y_2)$, ..., $(x_t, y_t)$, and $Y_0$ has coordinates of feature points being $(x_1', y_1')$, $(x_2', y_2')$, ..., $(x_t', y_t')$, the homography matrix is applied to the pairs of feature points, and the formula of the homography matrix $H_K$ may be rewritten as the following formula:

$$\begin{bmatrix} -x_1 & -y_1 & -1 & 0 & 0 & 0 & x_1 x_1' & y_1 x_1' & x_1' \\ 0 & 0 & 0 & -x_1 & -y_1 & -1 & x_1 y_1' & y_1 y_1' & y_1' \\ -x_2 & -y_2 & -1 & 0 & 0 & 0 & x_2 x_2' & y_2 x_2' & x_2' \\ 0 & 0 & 0 & -x_2 & -y_2 & -1 & x_2 y_2' & y_2 y_2' & y_2' \\ M & M & M & M & M & M & M & M & M \end{bmatrix} \begin{bmatrix} h_1 \\ h_2 \\ M \\ h_9 \end{bmatrix} = 0 \; AH_K = 0$$

where, M in the above matrix represents vertical ellipsis in the matrix, and the above matrix A is a matrix with a number of rows twice the number of the corresponding pairs of feature points. Coefficients of the equation of the above pairs of feature points are stacked into a matrix, and then a singular value decomposition (SVD) algorithm may be used to find the least squares solution of the homography matrix $H_k$, and then an offset [$m_{vxk}$, $m_{vyk}$] of each point in the luma image $Y_K$ with respect to $Y_0$ may be calculated.

Of course, the offset of each of the remaining images relative to the above-mentioned reference luma image may also be obtained by other manners. For example, an optical flow vector from each point in the luma image $Y_K$ to the reference image $Y_0$ may be solved based on brightness information around each point in any two adjacent images. And then, an offset [$m_{vxk}$, $m_{vyk}$] of each point in the luma image $Y_K$ relative to $Y_0$ may be calculated based on the optical flow vector of each point. The calculation process of the above offset is not limited here.

At block 105, the N luma images are fused, based on the offset of each of the remaining images relative to the reference luma image, through a trained neural network to obtain a target luma image, the target luma image having a higher resolution than the first YUV images.

In embodiments of the disclosure, the neural network may be a 3D convolutional neural network or other types of neural networks, which is not limited herein. For example, the neural network is the 3D convolutional neural network. In order to better illustrate the 3D convolutional neural network according to embodiments of the disclosure, the 3D convolutional neural network is introduced from three aspects: input data, network structure and loss function.

The input data of the 3D convolutional neural network is the N luma images. In detail, the input data includes four dimensions [c, d, w, h], where w represents a width of the N luma images, h represents a height of the N luma images, c represents a number of channels of the N luma images, and d represents image depth of the N luma images. It should be noted that the number of channels is a preset value set by research and development personnel when designing the 3D convolutional neural network. According to embodiments of the disclosure, the N luma images may be input to the 3D convolutional neural network. Each of the N luma images includes three channels, namely luma Y, and the offset $mv_x$ and $mv_y$ of the luma image relative to the reference luma image. The image depth refers to the number N of the input luma images. For most of the super-resolution neural networks based on a single image, such as super-resolution convolutional neural network (SRCNN) and photo-realistic single image super-resolution using a generative adversarial network (SRGAN), which are currently widely used, as the input data are the single image, the dimension of image depth d is missing compared with the input data of the 3D convolutional neural network according to embodiments of the disclosure. As the super-resolution reconstruction based on a single image cannot use sub-pixel displacements between a plurality of images, a reconstructed image obtained based on a single image is blurred (such as SRCNN), or a reconstructed image will produce some false details (such as SRGAN).

Figure 2:
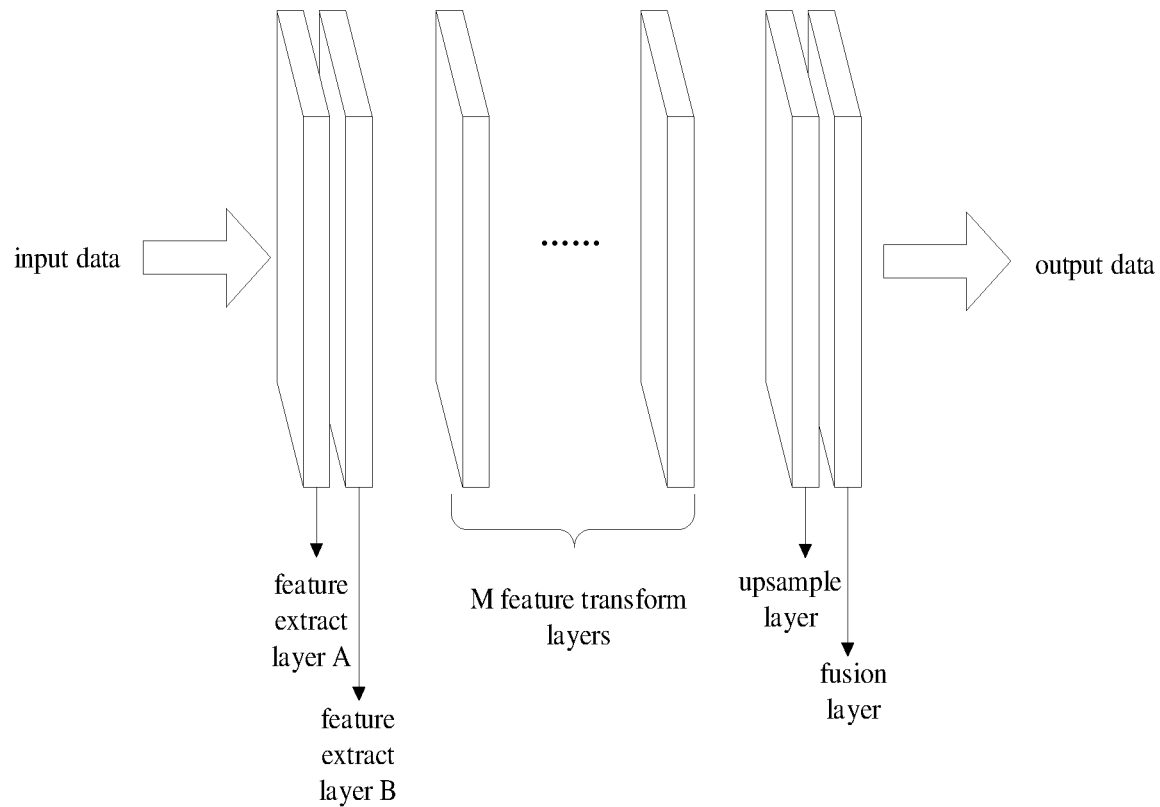
FIG. 2 is a schematic diagram of a 3D convolutional neural network adopted in an image super-resolution reconstruction method according to an embodiment of the disclosure.

The network structure of the 3D convolutional neural network may include a feature extract layer, a feature transform layer, an upsample layer, and a fusion layer. With reference to FIG. 2, the following describes the work of each of the above layers to illustrate the workflow of the above 3D convolutional neural network.

The work content of the feature extract layer is to extract linear features of the luma images through a large convolution kernel. The linear features may include gradient, luma, size relationship, etc., which are not limited here. Generally, there are two above linear extract layers. In embodiments of the disclosure, the two layers are referred to as a feature extract layer A and a feature extract layer B. Compared with the input luma images, images with the linear features, output by the above feature extract layer, have the same image depth, the same image size, and an increasing number of channels. In detail, take the luma images that are input to the 3D convolutional neural network being eight frames as an example. The following table 1 illustrates parameters of a network structure of the above feature extract layers.

TABLE 1

| Name | Size of the convolution kernels | Input depth (d_in) | Output depth (d_out) | Input channels (c_in) | Output channels (c_out) | Scale factor |
|---|---|---|---|---|---|---|
| Feature extract layer A | 5 × 5 | 8 | 8 | 3 | 32 | ×1 |
| Feature extract layer B | 5 × 5 | 8 | 8 | 32 | 64 | ×1 |

The work content of the feature transform layer is to perform nonlinear combinations on the linear features extracted by the feature extract layer through a small convolution kernel to obtain nonlinear features. The more the number of the above feature transform layers, the higher the degree of nonlinearity of the transformed features, the stronger the ability to express complex image structures, and the more the beneficial to the authenticity of image reconstruction. Compared with the input images with the linear features (that is, the images output by the feature extract layer), the images with the nonlinear features, output by the above feature transform layer, have the same image depth, the same image size, and the same number of channels. The work process is repeated M times, and M is the number of the feature transform layers. It should be noted that the value of M needs to be 2 to the power of m, and m is a positive integer. In embodiments of the disclosure, for example, M=16. The following Table 2 illustrates parameters of a network structure of the above feature transform layer.

TABLE 2

| Name | Size of the convolution kernel | Input depth (d_in) | Output depth (d_out) | Input channels (c_in) | Output channels (c_out) | Scale factor |
|---|---|---|---|---|---|---|
| Feature transform layer*M | 3 × 3 | 8 | 8 | 64 | 64 | ×1 |

The upsample layer is not a convolutional layer, and the work content of the upsample layer is to upsample the images output by the above feature transform layer to a desired preset ratio through interpolation processing, such as a ratio of ×2. The above-mentioned interpolation processing may be bi-cubic interpolation processing, bilinear interpolation processing or other types of interpolation processing, which is not limited herein. The fusion layer follows the above-mentioned upsample layer closely, and the work content of the fusion layer is to fuse the plurality of images upsampled by the upsample layer into one super-resolution image and to output the one super-resolution image. Optionally, the upsample layer may also upsample the images output by the feature transform layer to the desired preset ratio in other ways. For example, a deconvolution kernel or pixel-shuffle may be used to keep the size of the images unchanged, and to upsample the number of channels to the required preset ratio. The obtained images of a plurality of channels may be combined into one image of channels to achieve upsampling of the images.

In embodiments of the disclosure, a preset ratio of ×2 is taken as an example. The following Table 3 illustrates parameters of network structures of the upsample layer and the fusion layer.

TABLE 3

| Name | Size of the convolution kernel | Input depth (d_in) | Output depth (d_out) | Input channels (c_in) | Output channels (c_out) | Scale factor |
|---|---|---|---|---|---|---|
| Upsample layer | — | 8 | 8 | 64 | 64 | ×2 |
| Fusion layer | 5 × 5 | 8 | 1 | 64 | 1 | ×1 |

It may be seen from the above example that the 3D convolutional neural network may fuse the input low-resolution N luma images into one super-resolution image (that is, a high-resolution image), and may upsample a size of an image based on user needs, so that the size of the super-resolution image is several times the size of the input luma images. It should be noted that unit structures of each layer in the above 3D convolutional neural network may use a combination of convolution kernels, rather than a single convolution kernel. For example, the above transform layer may use a single 3×3 convolution kernel, or a series combination of a 1×1 convolution kernel and a 3×3 convolution kernel, which is not limited here in this regard.

In addition to input data and network structures of the 3D convolutional neural network, loss functions of the 3D convolutional neural network are also the key to construct the 3D convolutional neural network. Generally, the convolutional neural networks with super-resolution reconstruction performed based on single image, such as SRCNN and SRGAN mentioned above, may adopt l2 loss and GAN loss, or l1 loss and GAN loss in the choice of loss functions. l1 loss/l2 loss is used for fidelity and smoothness of images; and GAN loss is used to generate details that do not exist in a single image. Since the plurality of images includes information of sub-pixel displacement, in embodiments of the disclosure, it is not necessary to use GAN loss to produce details. Instead, a loss function that may ensure smoothness of an image while retaining details and sharp edges is needed. Consequently, the multi-scale structure similarity (MS-SSIM) adopted by the 3D convolutional neural network provided in embodiments of the disclosure is the basis of the loss function.

First, in the training process of the above 3D convolutional neural network, the structure similarity (SSIM) between a predicted super-resolution (SR) image and a real high-resolution (HR) image is calculated through the following formula:

$$SSIM(p) = \frac{2\mu_x\mu_y + C_1}{\mu_x^2 + \mu_y^2 + C_1} \cdot \frac{2\sigma_{xy} + C_2}{\sigma_x^2 + \sigma_y^2 + C_2} = l(p) \cdot cs(p)$$

where p represents a pixel in an image; $\mu_x$ represents an average luma value of the SR image; $\mu_y$ represents an average luma value of the HR image; $\sigma_x$ represents a luma variance of the SR image; $\sigma_y$ represents a luma variance of the HR image; $\sigma_{xy}$ represents a luma covariance between the SR image and the HR image; and $C_1$ and $C_2$ are anti-zeroing terms. Preferably, $C_1=(0.01*255)^2$, and $C_2=(0.03*255)^2$. In this manner, l(p) and cs(p) may be obtained, where l(p) represents a luma contrast factor, and cs(p) represents a contrast-ratio contrast factor.

Consequently, the SSIM at a plurality of scales may be calculated based on the above-mentioned SSIM. That is, MS-SSIM may be calculated by the following formula:

$$MS-SSIM(p) = l_M(p)\prod_{j=1}^{M} cs_j(p)$$

where $l_M(p)$ refers to the luma contrast factor at the maximum scale;

$$\prod_{j=1}^{M} cs_j(p)$$

represents a product of contrast factors at different scales. Different scales refer to zooming out two images (the SR image and the HR image) participating in a comparison in different proportions. The maximum scale refers to the size of original images (that is, the SR image and the HR image).

Finally, based on the above calculation formula of the MS-SSIM, the larger the MS-SSIM, the more similar the two images (that is, the SR image and the HR image) participating in the comparison. Since the training of the 3D convolutional neural network is to find a position with the lowest loss, the loss function of the 3D convolutional neural network is: $L^{MS-SSIM}(p)=1-MS-SSIM(p)$. Subtracting the MS-SSIM from 1 as the loss of the 3D convolutional neural network enables that in the training of the 3D convolutional neural network, the loss is lower, i.e., the higher the MS-SSIM, and the more similar the SR image predicted by the 3D convolutional neural network to the real HR image. When the above loss no longer drops, the training of the above 3D convolutional neural network may be ended, thus a trained 3D convolutional neural network is obtained. During the training of the above 3D convolutional neural network, the loss function used is established on the basis of the MS-SSIM, so the trained 3D convolutional neural network finally obtained may not only ensure the smoothness of images, but also effectively reconstruct the sharpness of the images at high-intensity edges and texture features in areas with rich details. Optionally, as another possible implementation, the loss function may also not use the MS-SSIM, but directly use single-scale SSIM loss, l1 loss, l2 loss, or GAN loss, which is not limited herein.

At block 106, interpolation processing is performed, based on a reference chroma frame, on the N chroma images to obtain a target chroma image, the target chroma image having a higher resolution than the first YUV images.

In embodiments of the disclosure, since human eyes are not particularly sensitive to the chroma information, there is no need to perform complex reconstruction on the chroma image. Based on this, after determining the reference luma image based on the above action at block 103, a chroma image associated with the reference luma image may be found in the N chroma images, and the chroma image found may be determined as the reference chroma frame. In detail, assuming that the chroma image and the luma image of the YUV image are extracted based on this original YUV image, the chroma image and the luma image are considered to be associated since the chroma image and the luma image belong to the same YUV image. After determining the reference chroma frame, the interpolation processing is performed, based on the reference chroma frame, on the N chroma images to obtain the high-resolution target chroma image. The interpolation processing may be bi-cubic interpolation processing, bilinear interpolation processing, or other types of interpolation processing, which are not limited herein. It should be noted that the size of the target chroma image obtained here is the same as the size of the target luma image described above. Considering that the upsample layer of the 3D convolutional neural network will upsample images at the preset ratio, an upsampling ratio of the interpolation processing in this action needs to be the synchronized with the preset ratio of upsampling adopted by the upsample layer of the 3D convolutional neural network.

Figure 3:
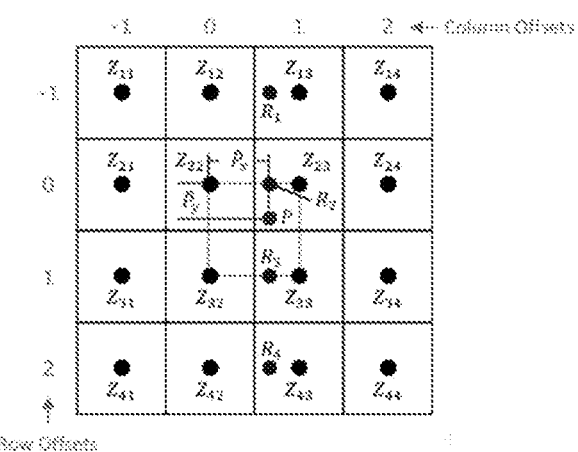
FIG. 3 is a schematic diagram of a bi-cubic interpolation operation in an image super-resolution reconstruction method according to an embodiment of the disclosure.

In detail, the bi-cubic interpolation is a method for determining weights of sampling points to a point to be interpolated based on distances between the point to be interpolated and the sampling points. The operation flow of the bi-cubic interpolation will be described below in combination with FIG. 3. For example, the point to be interpolated is P, sixteen sampling points $Z_{11}$ to $Z_{44}$ that are closest to the point P are selected. And then, rows are processed before columns. First, $[Z_{11}, Z_{12}, Z_{13}, Z_{14}]$ are used to interpolate $R_1$, $[Z_{21}, Z_{22}, Z_{23}, Z_{24}]$ are used to interpolate $R_2$, until $R_3$ and $R_4$ are interpolated in the same manner. And then, $[R_1, R_2, R_3, R_4]$ are used to interpolate P. The interpolation process takes the pixel value of point P as an example, and the following formula is used to calculate the point P:

$$P = \frac{1}{\sum_{t=1}^{4} W(d(P, R_t))} \sum_{t=1}^{4} W(d(P, R_t)) * R_t$$

where, d (P, $R_t$) represents the Euclidean distance from P to $R_t$ {t=1, 2, 3, 4}, and W(x) represents a weight calculated based on a distance x. In detail, the calculation formula of the above weight is as follows:

$$W(x) = \begin{cases} (a+2)|x|^3 - (a+3)|x|^2 + 1 & \text{for } |x| \leq 1 \\ a|x|^3 - 5a|x|^2 + 8a|x| - 4a & \text{for } 1 < |x| < 2 \\ 0 & \text{otherwise} \end{cases}$$

where, the value of a is preferably −0.5.

At block 107, the target luma image and the target chroma image are synthesized to obtain a target YUV image.

In embodiments of the disclosure, after obtaining the target luma image and the target chroma image of the same size, the target luma image and the target chroma image may be synthesized into one YUV image, that is, one high-resolution target YUV image may be obtained after reconstructing continuous N first YUV images.

It may be seen from the above that according to embodiments of the disclosure, the continuous N first YUV images are extracted through the Y channel and the UV channel to obtain N chroma images and N luma images. Since human eyes are sensitive to the luma information, sharpness estimation, image matching, and image reconstruction based on a neural network are sequentially performed on the N luma images so as to obtain a high-resolution target luma image. Since human eyes are insensitive to the chroma information, a simple image reconstruction is performed directly on the N chroma images through an interpolation algorithm to obtain a high-resolution target chroma image. The high-resolution target YUV image is finally obtained based on the target luma image and the target chroma image. The above process uses the neural network as the main body of image reconstruction, which may effectively against ghosting and blurred textures brought by errors of image registration and other image artifacts, ensuring the quality of reconstructed images. In addition, the robustness of the neural network may enable a mobile terminal to obtain a reliable effect on image super-resolution reconstruction in different scenarios such as trembling and high-speed motion of the mobile terminal.

It should be understood that sequence numbers of actions in the above embodiments does not mean an order of execution. The order of execution of each process should be determined by functions and internal logic of each process, and should not constitute any limitation on implementations of embodiments of the disclosure.

Figure 4:
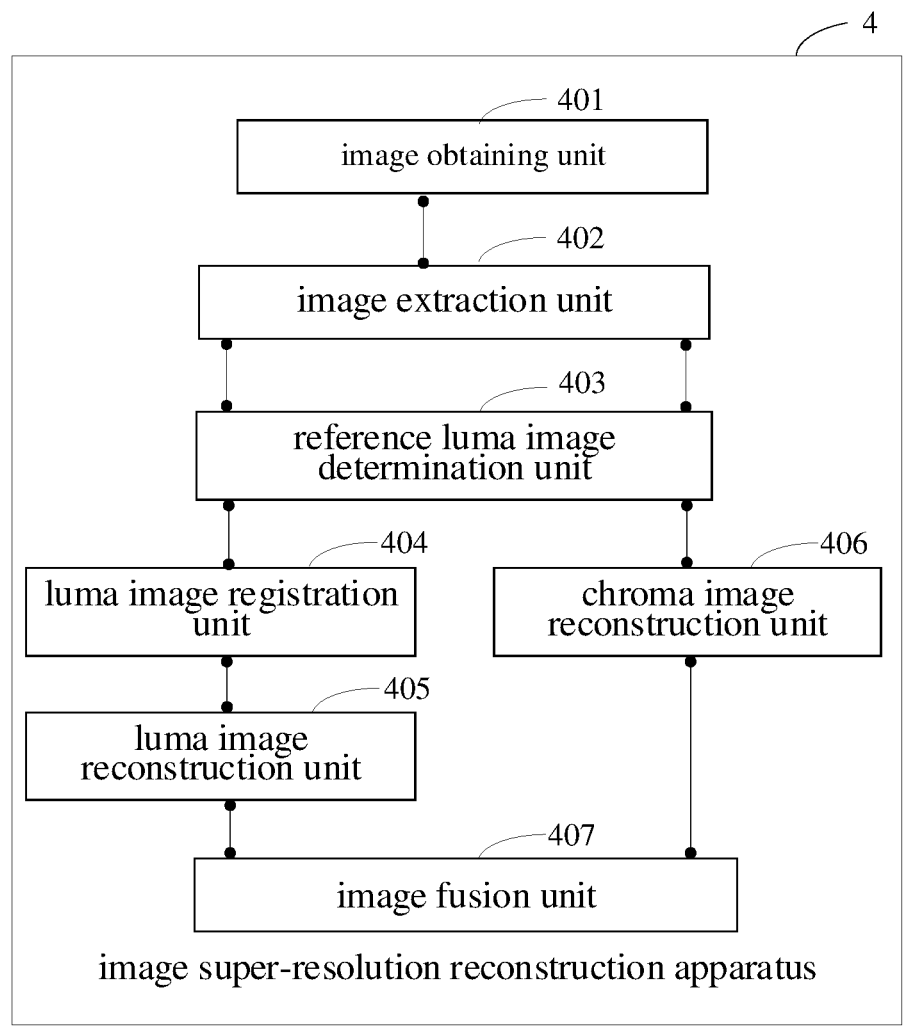
FIG. 4 is a block diagram of an image super-resolution reconstruction apparatus according to an embodiment of the disclosure.

Embodiments of the disclosure provide an image super-resolution reconstruction apparatus corresponding to the image super-resolution reconstruction method as described above. The following describes the image super-resolution reconstruction apparatus according to embodiments of the disclosure. With reference to FIG. 4, an image super-resolution reconstruction apparatus 4 includes an image obtaining unit 401, an image extraction unit 402, a reference luma image determination unit 403, a luma image registration unit 404, a luma image reconstruction unit 405, a chroma image reconstruction unit 406, and an image fusion unit 407.

The image obtaining unit 401 is configured to obtain continuous N first YUV images. N is a positive integer greater than 1.

The image extraction unit 402 is configured to extract a luma image and a chroma image corresponding to each of the N first YUV images to obtain N luma images and N chroma images.

The reference luma image determination unit 403 is configured to select, based on sharpness of each of the N luma images, a reference luma image from the N luma images.

The luma image registration unit 404 is configured to perform image registration on remaining images in the N luma images except the reference luma image and the reference luma image to obtain an offset of each of the remaining images relative to the reference luma image.

The luma image reconstruction unit 405 is configured to fuse, based on the offset of each of the remaining images relative to the reference luma image, the N luma images through a trained neural network to obtain a target luma image, the target luma image having a higher resolution than the first YUV images.

The chroma image reconstruction unit 406 is configured to perform, based on a reference chroma frame, interpolation processing on the N chroma images to obtain a target chroma image, the reference chroma frame being a chroma image associated with the reference luma image in the N chroma images, and the target chroma image having a higher resolution than the first YUV images.

The image fusion unit 407 is configured to synthesize the target luma image and the target chroma image to obtain a target YUV image.

Optionally, the reference luma image determination unit 403 includes a sharpness value calculation subunit and a reference image determination subunit.

The sharpness value calculation subunit is configured to calculate a sharpness value of each of the N luma images.

The reference image determination subunit is configured to determine a luma image with the highest sharpness value as the reference luma image.

Optionally, the sharpness value calculation subunit includes an area division subunit, a luma value obtaining subunit, a luma value determination subunit, and a sharpness estimation subunit.

The area division subunit is configured to segment a luma image to be calculated, into two or more sub-image areas, the luma image to be calculated being any one of the N luma images.

The luma value obtaining subunit is configured to obtain a luma value of each pixel in the luma image to be calculated.

The luma value determination subunit is configured to determine a maximum luma value and a minimum luma value in each of the sub-image areas based on the luma value of each pixel.

The sharpness estimation subunit is configured to perform, based on the maximum luma value and the minimum luma value in each of the sub-image areas, sharpness estimation on the luma image to be calculated through a preset sharpness reference model to obtain a sharpness value of the luma image to be calculated.

Optionally, the luma image registration unit 404 includes a feature point detection subunit, a distance calculation subunit, and a homography matrix solving subunit.

The feature point detection subunit is configured to perform feature point detection on a luma image to be matched and the reference luma image separately, the luma image to be matched being any one of the remaining images.

The distance calculation subunit is configured to calculate a Euclidean distance between each feature point of the luma image to be matched and a corresponding feature point of the reference luma image.

The homography matrix solving subunit is configured to solve, based on the Euclidean distance between each feature point of the luma image to be matched and the corresponding feature point of the reference luma image, a homography matrix of the luma image to be matched to the reference luma image to obtain an offset of the luma image to be matched to the reference luma image.

Optionally, the feature point detection subunit is configured to perform the feature point detection on the luma image to be matched and the reference luma image separately based on a preset scale-invariant feature transform algorithm.

Optionally, the distance calculation subunit includes a gradient histogram establishing subunit, a feature vector establishing subunit, and a Euclidean distance calculation subunit.

The gradient histogram establishing subunit is configured to establish a gradient histogram of each feature point of the luma image to be matched, and a gradient histogram of the corresponding feature point of the reference luma image.

The feature vector establishing subunit is configured to generate a feature vector of each feature point of the luma image to be matched based on the gradient histogram of each feature point of the luma image to be matched, and a feature vector of the corresponding feature point of the reference luma image based on the gradient histogram of the corresponding feature point of the reference luma image.

The Euclidean distance calculation subunit is configured to calculate the Euclidean distance between each feature point of the luma image to be matched and the corresponding feature point of the reference luma image based on the feature vector of each feature point of the luma image to be matched and the feature vector of the corresponding feature point of the reference luma image.

Optionally, the neural network includes a feature extract layer, a feature transform layer, an upsample layer, and a fusion layer.

The feature extract layer is configured to extract linear features of each of the N luma images.

The feature transform layer is configured to convert the linear features of each of the N luma images to obtain non-linear features of each of the N luma images.

The upsample layer is configured to perform interpolation processing on an image output by the feature transform layer to upsample the image to a preset size.

The fusion layer is configured to fuse the image upsampled to obtain the high-resolution target luma image.

It may be seen from the above that according to embodiments of the disclosure, the continuous N first YUV images are extracted through the Y channel and the UV channel to obtain N chroma images and N luma images. Since human eyes are sensitive to the luma information, sharpness estimation, image matching, and image reconstruction based on a neural network are sequentially performed on the N luma images so as to obtain a high-resolution target luma image. Since human eyes are insensitive to the chroma information, a simple image reconstruction is performed directly on the N chroma images through an interpolation algorithm to obtain a high-resolution target chroma image. The high-resolution target YUV image is finally obtained based on the target luma image and the target chroma image. The above process uses the neural network as the main body of image reconstruction, which may effectively against ghosting and blurred textures brought by errors of image registration and other image artifacts, ensuring the quality of reconstructed images. In addition, the robustness of the neural network may enable a mobile terminal to obtain a reliable effect on image super-resolution reconstruction in different scenarios such as trembling and high-speed motion of the mobile terminal.

Figure 5:
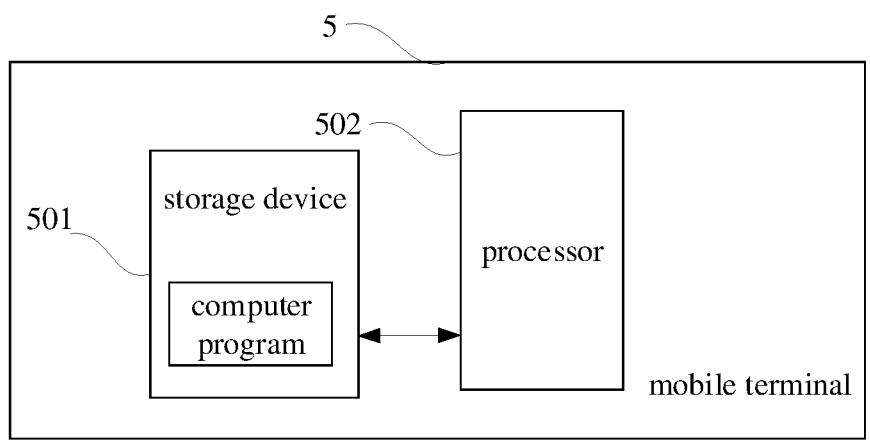
FIG. 5 is a schematic diagram of a mobile terminal according to an embodiment of the disclosure.

Embodiments of the disclosure further provide a mobile terminal. The mobile terminal may be a smart phone, a tablet computer, etc., which is not limited herein. Referring to FIG. 5, a mobile terminal 5 according to an embodiment of the disclosure includes a storage device 501, one or more processors 502 (FIG. 5 illustrates one processor), and a computer program stored on the storage device 501 and operable on the one or more processors 502. The storage device 501 is configured to store software programs and modules. The processor 502 executes various functional applications and data processing by running the software programs and units stored in the storage device 501 to obtain resources corresponding to the above preset events. In detail, the processor 502 implements the following actions by running the computer program stored in the storage device 501.

The actions include: obtaining continuous N first YUV images, N being a positive integer greater than 1; extracting a luma image and a chroma image corresponding to each of the N first YUV images to obtain N luma images and N chroma images; selecting, based on sharpness of each of the N luma images, a reference luma image from the N luma images; performing image registration on remaining images in the N luma images except the reference luma image and the reference luma image to obtain an offset of each of the remaining images relative to the reference luma image; fusing, based on the offset of each of the remaining images relative to the reference luma image, the N luma images through a trained neural network to obtain a target luma image, the target luma image having a higher resolution than the first YUV images; performing, based on a reference chroma frame, interpolation processing on the N chroma images to obtain a target chroma image, the reference chroma frame being a chroma image associated with the reference luma image in the N chroma images, and the target chroma image having a higher resolution than the first YUV images; and synthesizing the target luma image and the target chroma image to obtain a target YUV image.

Assuming that the above is a first possible implementation, in a second possible implementation provided on the basis of the first possible implementation, selecting, based on the sharpness of each of the N luma images, the reference luma image from the N luma images, includes: calculating a sharpness value of each of the N luma images; and determining a luma image with the highest sharpness value as the reference luma image.

In a third possible implementation provided on the basis of the second possible implementation, calculating the sharpness value of each of the N luma images includes: segmenting, a luma image to be calculated, into two or more sub-image areas, the luma image to be calculated being any one of the N luma images; obtaining a luma value of each pixel in the luma image to be calculated; determining a maximum luma value and a minimum luma value in each of the sub-image areas based on the luma value of each pixel; and performing, based on the maximum luma value and the minimum luma value in each of the sub-image areas, sharpness estimation on the luma image to be calculated through a preset sharpness reference model to obtain a sharpness value of the luma image to be calculated.

In a fourth possible implementation provided on the basis of the first possible implementation, performing the image registration on remaining images in the N luma images except the reference luma image and the reference luma image to obtain an offset of each of the remaining images relative to the reference luma image includes: performing feature point detection on a luma image to be matched and the reference luma image separately, the luma image to be matched being any one of the remaining images; calculating a Euclidean distance between each feature point of the luma image to be matched and a corresponding feature point of the reference luma image; and solving, based on the Euclidean distance between each feature point of the luma image to be matched and the corresponding feature point of the reference luma image, a homography matrix of the luma image to be matched to the reference luma image to obtain an offset of the luma image to be matched to the reference luma image.

In a fifth possible implementation provided on the basis of the fourth possible implementation, performing the feature point detection on the luma image to be matched and the reference luma image separately includes: performing the feature point detection on the luma image to be matched and the reference luma image separately based on a preset scale-invariant feature transform algorithm.

In a sixth possible implementation provided on the basis of the fourth possible implementation, calculating the Euclidean distance between each feature point of the luma image to be matched and the corresponding feature point of the reference luma image includes: establishing a gradient histogram of each feature point of the luma image to be matched, and a gradient histogram of the corresponding feature point of the reference luma image; generating a feature vector of each feature point of the luma image to be matched based on the gradient histogram of each feature point of the luma image to be matched, and a feature vector of the corresponding feature point of the reference luma image based on the gradient histogram of the corresponding feature point of the reference luma image; and calculating the Euclidean distance between each feature point of the luma image to be matched and the corresponding feature point of the reference luma image based on the feature vector of each feature point of the luma image to be matched and the feature vector of the corresponding feature point of the reference luma image.

In a seventh possible implementation provided on the basis of the first possible implementation, the neural network includes a feature extract layer, a feature transform layer, an upsample layer, and a fusion layer. The feature extract layer is configured to extract linear features of each of the N luma images. The feature transform layer is configured to convert the linear features of each of the N luma images to obtain non-linear features of each of the N luma images. The upsample layer is configured to perform interpolation processing on an image output by the feature transform layer to upsample the image to a preset size. The fusion layer is configured to fuse the image upsampled to obtain the high-resolution target luma image.

It should be understood that in embodiments of the disclosure, the processor 502 may be a central processing unit (CPU). The processor may also be other general-purpose processor, a digital signal processor (DSP), an application specific integrated circuit (ASIC), a field-programmable gate array (FPGA) or other programmable logic device, a discrete gate or a transistor logic device, a discrete hardware component, and so on. The general-purpose processor may be a microprocessor, or the processor may be any conventional processor or the like.

The storage device 501 may include a read-only memory and a random-access memory, and provide instructions and data to the processor 502. Part or all of the storage device 501 may also include a non-volatile random-access memory. For example, the storage device 501 may also store type information of devices.

It may be seen from the above that according to embodiments of the disclosure, the continuous N first YUV images are extracted through the Y channel and the UV channel to obtain N chroma images and N luma images. Since human eyes are sensitive to the luma information, sharpness estimation, image matching, and image reconstruction based on a neural network are sequentially performed on the N luma images so as to obtain a high-resolution target luma image. Since human eyes are insensitive to the chroma information, a simple image reconstruction is performed directly on the N chroma images through an interpolation algorithm to obtain a high-resolution target chroma image. The high-resolution target YUV image is finally obtained based on the target luma image and the target chroma image. The above process uses the neural network as the main body of image reconstruction, which may effectively against ghosting and blurred textures brought by errors of image registration and other image artifacts, ensuring the quality of reconstructed images. In addition, the robustness of the neural network may enable a mobile terminal to obtain a reliable effect on image super-resolution reconstruction in different scenarios such as trembling and high-speed motion of the mobile terminal.

Those skilled in the art can clearly understand that, for convenience and conciseness of description, the above-mentioned divisions of functional units and modules are only used as examples for illustration. In practical applications, the above-mentioned functions may be allocated to different functional units and modules for completion, that is, the internal structure of the above system is segmented into different functional units or modules to implement all or part of the functions described above. The functional units and modules in embodiments may be integrated into one processing unit, each unit may exist alone physically, or two or more units may be integrated into one unit. The above integrated unit may be implemented in the form of hardware, or in the form of software functional units. In addition, specific names of each functional unit and module are only for the purpose of distinction, and are not used to limit the protection scope of the disclosure. For the specific working processes of the units and modules in the above system, reference may be made to corresponding processes in the foregoing method embodiments, and thus repeated description is omitted herein.

In above embodiments, descriptions of respective embodiments are emphasized differently, and parts that are not detailed in some embodiments can refer to relevant descriptions of other embodiments.

Those skilled in the art could be aware that, example units and algorithm steps described in combination with embodiments disclosed herein may be implemented by electronic hardware, or by a combination of computer software and electronic hardware. Whether these functions are executed by hardware or software is dependent on particular use and design constraints of the technical solutions. Professionals may adopt different methods for different particular uses to implement described functions, which should not be regarded as going beyond the scope of the disclosure.

In several embodiments provided by the disclosure, it should be understood that, the disclosed system and method may be implemented in other ways. For example, the system embodiments described above are merely illustrative. For example, the modules or units are merely segmented according to logic functions, and can be segmented in other ways in actual implementation. For example, a plurality of units or components may be combined or may be integrated into another system, or some features may be ignored or not executed. In addition, the mutual coupling or direct coupling or communication connection illustrated or discussed may be via some interfaces, or direct coupling or communication connection of devices or units may be in an electrical, mechanical, or other form.

The units described as separate parts may or may not be physically separated. Parts displayed as units may or may not be physical units, i.e., the parts may be located in one place, or may be distributed on a plurality of network units. Some or all of the units can be selected according to actual needs to achieve purposes of solutions of the embodiments.

When the above integrated unit is implemented in the form of a software functional unit and sold or used as an independent product, it may be stored in a computer-readable storage medium. Based on this understanding, the disclosure implements all or part of the processes in the method according to the above embodiments, and instructs relevant hardware to implement all or part of the processes in the method according to the above embodiments through a computer program. The computer program can be stored in a computer-readable storage medium. When the computer program is executed by a processor, steps of the foregoing method embodiments may be implemented. The computer program includes codes of the computer program. The codes of the computer program may be in a form of source codes, object codes, an executable file, some intermediate form, and so on. The computer-readable storage medium may include: any entity or apparatus capable of carrying the above-mentioned codes of the computer program, a recording medium, a USB flash disk, a mobile hard disk, a magnetic disk, an optical disk, a computer-readable memory, a read-only memory (ROM), a random access memory (RAM), a power line carrier signal, a telecommunication signal, a software distribution medium, and the like. It should be noted that the content included in the computer-readable storage medium can be appropriately added or deleted based on requirements of legislation and patent practice in jurisdictions. For example, in some jurisdictions, legislation and patent practice define that the computer-readable storage medium does not include a power line carrier signal or a telecommunication signal.

The above embodiments are only used to illustrate the technical solutions of the disclosure, rather than to limit the disclosure. Although the disclosure has been described in detail with reference to the foregoing embodiments, those skilled in the art should understand that modifications of the technical solutions recorded by the foregoing embodiments are possible, or equivalent replacements of some of the technical features of the technical solutions may be made. The modifications or replacements do not deviate essences of corresponding technical solutions from the spirit and scope of the technical solutions of the embodiments of the disclosure, and should be included in the protection scope of the disclosure

What is claimed is:

1. A method for image super-resolution reconstruction, comprising:

obtaining continuous N first YUV images, N being a positive integer greater than 1;

extracting a luma image and a chroma image corresponding to each of the N first YUV images to obtain N luma images and N chroma images;

selecting, based on sharpness of each of the N luma images, a reference luma image from the N luma images;

performing image registration on remaining images in the N luma images except the reference luma image and the reference luma image to obtain an offset of each of the remaining images relative to the reference luma image;

fusing, based on the offset of each of the remaining images relative to the reference luma image, the N luma images through a trained neural network to obtain a target luma image, the target luma image having a higher resolution than the N first YUV images;

performing, based on a reference chroma frame, interpolation processing on the N chroma images to obtain a target chroma image, the reference chroma frame being a chroma image associated with the reference luma image in the N chroma images, and the target chroma image having a higher resolution than the N first YUV images; and synthesizing the target luma image and the target chroma image to obtain a target YUV image.

2. The method of claim 1, wherein selecting, based on the sharpness of each of the N luma images, the reference luma image from the N luma images comprises:

calculating a sharpness value of each of the N luma images; and determining a luma image with the highest sharpness value as the reference luma image.

3. The method of claim 2, wherein calculating the sharpness value of each of the N luma images comprises:

segmenting, a luma image to be calculated, into two or more sub-image areas, the luma image to be calculated being any one of the N luma images;

obtaining a luma value of each pixel in the luma image to be calculated;

determining a maximum luma value and a minimum luma value in each of the sub-image areas based on the luma value of each pixel; and performing, based on the maximum luma value and the minimum luma value in each of the sub-image areas, sharpness estimation on the luma image to be calculated through a preset sharpness reference model to obtain a sharpness value of the luma image to be calculated.

4. The method of claim 1, wherein performing the image registration on remaining images in the N luma images except the reference luma image and the reference luma image to obtain an offset of each of the remaining images relative to the reference luma image comprises:

performing feature point detection on a luma image to be matched and the reference luma image separately, the luma image to be matched being any one of the remaining images;

calculating a Euclidean distance between each feature point of the luma image to be matched and a corresponding feature point of the reference luma image; and solving, based on the Euclidean distance between each feature point of the luma image to be matched and the corresponding feature point of the reference luma image, a homography matrix of the luma image to be matched to the reference luma image to obtain an offset of the luma image to be matched to the reference luma image.

5. The method of claim 4, wherein performing the feature point detection on the luma image to be matched and the reference luma image separately comprises:
performing the feature point detection on the luma image to be matched and the reference luma image separately based on a preset scale-invariant feature transform algorithm.

6. The method of claim 4, wherein calculating the Euclidean distance between each feature point of the luma image to be matched and the corresponding feature point of the reference luma image comprises:
establishing a gradient histogram of each feature point of the luma image to be matched, and a gradient histogram of the corresponding feature point of the reference luma image;
generating a feature vector of each feature point of the luma image to be matched based on the gradient histogram of each feature point of the luma image to be matched, and a feature vector of the corresponding feature point of the reference luma image based on the gradient histogram of the corresponding feature point of the reference luma image; and
calculating the Euclidean distance between each feature point of the luma image to be matched and the corresponding feature point of the reference luma image based on the feature vector of each feature point of the luma image to be matched and the feature vector of the corresponding feature point of the reference luma image.

7. The method of claim 1, wherein the neural network comprises a feature extract layer, a feature transform layer, an upsample layer, and a fusion layer,
the feature extract layer is configured to extract linear features of each of the N luma images,
the feature transform layer is configured to convert the linear features of each of the N luma images to obtain non-linear features of each of the N luma images,
the upsample layer is configured to perform interpolation processing on an image output by the feature transform layer to upsample the image to a preset size, and
the fusion layer is configured to fuse the image upsampled to obtain the higher resolution target luma image.

8. The method of claim 1, wherein the target luma image has the same resolution with the target chroma image.

9. A mobile terminal, comprising:
a storage device for storing a computer program;
a processor, configured to execute the computer program, to carry out:
obtaining continuous N first YUV images, N being a positive integer greater than 1;
extracting a luma image and a chroma image corresponding to each of the N first YUV images to obtain N luma images and N chroma images;
selecting, based on sharpness of each of the N luma images, a reference luma image from the N luma images;
performing image registration on remaining images in the N luma images except the reference luma image and the reference luma image to obtain an offset of each of the remaining images relative to the reference luma image;
fusing, based on the offset of each of the remaining images relative to the reference luma image, the N luma images through a trained neural network to obtain a target luma image, the target luma image having a higher resolution than the N first YUV images;
performing, based on a reference chroma frame, interpolation processing on the N chroma images to obtain a target chroma image, the reference chroma frame being a chroma image associated with the reference luma image in the N chroma images, and the target chroma image having a higher resolution than the N first YUV images; and
synthesizing the target luma image and the target chroma image to obtain a target YUV image.

10. The mobile terminal of claim 9, wherein selecting, based on the sharpness of each of the N luma images, the reference luma image from the N luma images comprises:
calculating a sharpness value of each of the N luma images; and
determining a luma image with the highest sharpness value as the reference luma image.

11. The mobile terminal of claim 10, wherein calculating the sharpness value of each of the N luma images comprises:
segmenting, a luma image to be calculated, into two or more sub-image areas, the luma image to be calculated being any one of the N luma images;
obtaining a luma value of each pixel in the luma image to be calculated;
determining a maximum luma value and a minimum luma value in each of the sub-image areas based on the luma value of each pixel; and
performing, based on the maximum luma value and the minimum luma value in each of the sub-image areas, sharpness estimation on the luma image to be calculated through a preset sharpness reference model to obtain a sharpness value of the luma image to be calculated.

12. The mobile terminal of claim 9, wherein performing the image registration on remaining images in the N luma images except the reference luma image and the reference luma image to obtain an offset of each of the remaining images relative to the reference luma image comprises:
performing feature point detection on a luma image to be matched and the reference luma image separately, the luma image to be matched being any one of the remaining images;
calculating a Euclidean distance between each feature point of the luma image to be matched and a corresponding feature point of the reference luma image; and
solving, based on the Euclidean distance between each feature point of the luma image to be matched and the corresponding feature point of the reference luma image, a homography matrix of the luma image to be matched to the reference luma image to obtain an offset of the luma image to be matched to the reference luma image.

13. The mobile terminal of claim 12, wherein performing the feature point detection on the luma image to be matched and the reference luma image separately comprises:
performing the feature point detection on the luma image to be matched and the reference luma image separately based on a preset scale-invariant feature transform algorithm.

14. The mobile terminal of claim 12, wherein calculating the Euclidean distance between each feature point of the luma image to be matched and the corresponding feature point of the reference luma image comprises:

establishing a gradient histogram of each feature point of the luma image to be matched, and a gradient histogram of the corresponding feature point of the reference luma image;

generating a feature vector of each feature point of the luma image to be matched based on the gradient histogram of each feature point of the luma image to be matched, and a feature vector of the corresponding feature point of the reference luma image based on the gradient histogram of the corresponding feature point of the reference luma image; and calculating the Euclidean distance between each feature point of the luma image to be matched and the corresponding feature point of the reference luma image based on the feature vector of each feature point of the luma image to be matched and the feature vector of the corresponding feature point of the reference luma image.

15. A non-transitory computer-readable storage medium having a computer program stored thereon, wherein when the computer program is executed by a processor, an image super-resolution reconstruction method is implemented, the method comprising:

obtaining continuous N first YUV images, N being a positive integer greater than 1;

extracting a luma image and a chroma image corresponding to each of the N first YUV images to obtain N luma images and N chroma images;

selecting, based on sharpness of each of the N luma images, a reference luma image from the N luma images;

performing image registration on remaining images in the N luma images except the reference luma image and the reference luma image to obtain an offset of each of the remaining images relative to the reference luma image;

fusing, based on the offset of each of the remaining images relative to the reference luma image, the N luma images through a trained neural network to obtain a target luma image, the target luma image having a higher resolution than the N first YUV images;

performing, based on a reference chroma frame, interpolation processing on the N chroma images to obtain a target chroma image, the reference chroma frame being a chroma image associated with the reference luma image in the N chroma images, and the target chroma image having a higher resolution than the N first YUV images; and synthesizing the target luma image and the target chroma image to obtain a target YUV image.

16. The non-transitory computer-readable storage medium of claim 15, wherein selecting, based on the sharpness of each of the N luma images, the reference luma image from the N luma images comprises:

calculating a sharpness value of each of the N luma images; and determining a luma image with the highest sharpness value as the reference luma image.

17. The non-transitory computer-readable storage medium of claim 16, wherein calculating the sharpness value of each of the N luma images comprises:

segmenting, a luma image to be calculated, into two or more sub-image areas, the luma image to be calculated being any one of the N luma images;

obtaining a luma value of each pixel in the luma image to be calculated;

determining a maximum luma value and a minimum luma value in each of the sub-image areas based on the luma value of each pixel; and performing, based on the maximum luma value and the minimum luma value in each of the sub-image areas, sharpness estimation on the luma image to be calculated through a preset sharpness reference model to obtain a sharpness value of the luma image to be calculated.

18. The non-transitory computer-readable storage medium of claim 15, wherein performing the image registration on remaining images in the N luma images except the reference luma image and the reference luma image to obtain an offset of each of the remaining images relative to the reference luma image comprises:

performing feature point detection on a luma image to be matched and the reference luma image separately, the luma image to be matched being any one of the remaining images;

calculating a Euclidean distance between each feature point of the luma image to be matched and a corresponding feature point of the reference luma image; and solving, based on the Euclidean distance between each feature point of the luma image to be matched and the corresponding feature point of the reference luma image, a homography matrix of the luma image to be matched to the reference luma image to obtain an offset of the luma image to be matched to the reference luma image.

19. The non-transitory computer-readable storage medium of claim 18, wherein performing the feature point detection on the luma image to be matched and the reference luma image separately comprises:

performing the feature point detection on the luma image to be matched and the reference luma image separately based on a preset scale-invariant feature transform algorithm.

20. The non-transitory computer-readable storage medium of claim 18, wherein calculating the Euclidean distance between each feature point of the luma image to be matched and the corresponding feature point of the reference luma image comprises:

establishing a gradient histogram of each feature point of the luma image to be matched, and a gradient histogram of the corresponding feature point of the reference luma image;

generating a feature vector of each feature point of the luma image to be matched based on the gradient histogram of each feature point of the luma image to be matched, and a feature vector of the corresponding feature point of the reference luma image based on the gradient histogram of the corresponding feature point of the reference luma image; and calculating the Euclidean distance between each feature point of the luma image to be matched and the corresponding feature point of the reference luma image based on the feature vector of each feature point of the luma image to be matched and the feature vector of the corresponding feature point of the reference luma image.

* * * * *